US008523730B2

(12) United States Patent
Miyawaki et al.

(10) Patent No.: US 8,523,730 B2
(45) Date of Patent: Sep. 3, 2013

(54) PLANETARY GEAR UNIT AND IMAGE FORMING APPARATUS INCLUDING SAME

(75) Inventors: Katsuaki Miyawaki, Kanagawa (JP); Hiromichi Matsuda, Kanagawa (JP); Tetsuo Watanabe, Kanagawa (JP); Nobuo Iwata, Kanagawa (JP); Keisuke Shimizu, Tokyo (JP); Yasuhiro Maehata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 23 days.

(21) Appl. No.: 13/356,096

(22) Filed: Jan. 23, 2012

(65) Prior Publication Data
US 2012/0196720 A1    Aug. 2, 2012

(30) Foreign Application Priority Data

Feb. 1, 2011  (JP) ................. 2011-019643
Nov. 9, 2011  (JP) ................. 2011-245510

(51) Int. Cl.
*F16H 57/08*    (2006.01)
(52) U.S. Cl.
USPC ........................................ 475/331
(58) Field of Classification Search
None
See application file for complete search history.

(56) References Cited

U.S. PATENT DOCUMENTS

| 2,959,073 | A | * | 11/1960 | Doerfer et al. | 475/348 |
| 4,756,212 | A | * | 7/1988 | Fuehrer | 475/159 |
| 4,901,601 | A | * | 2/1990 | Leggat | 475/348 |
| 4,998,909 | A | * | 3/1991 | Fuehrer | 475/331 |
| 6,023,836 | A | * | 2/2000 | Matsuoka et al. | 29/557 |
| 7,527,577 | B2 | * | 5/2009 | Dalenberg et al. | 475/331 |
| 7,686,727 | B2 | * | 3/2010 | Hammill | 475/159 |
| 8,251,862 | B2 | * | 8/2012 | Burgman et al. | 475/348 |
| 2009/0258753 | A1 | * | 10/2009 | Dalenberg et al. | 475/342 |
| 2013/0065725 | A1 | * | 3/2013 | Matsuda et al. | 475/159 |

FOREIGN PATENT DOCUMENTS

| JP | 2002-242999 A | 8/2002 |
| JP | 2004-142010 A | 5/2004 |
| JP | 2008-151868 A | 7/2008 |

* cited by examiner

*Primary Examiner* — Dirk Wright
(74) *Attorney, Agent, or Firm* — Harness, Dickey & Pierce, P.L.C.

(57) ABSTRACT

A planetary gear unit including a sun gear rotatable by torque from a drive source, an outer gear disposed coaxially with the sun gear, multiple planetary gears disposed within the outer gear at equal intervals along an inner circumference of the outer gear to engage the sun gear and the outer gear, a carrier pin to rotatably support each of the multiple planetary gears, and a carrier rotatable coaxially with the sun gear and the outer gear to support both ends of the carrier pin. At least a first end of the carrier pin is constructed of a circular portion and a linear portion to form a first supported part. The carrier includes a first support part that supports the first supported part and is formed to position the circular portion of the first supported part downstream from the linear portion in a direction of rotation of the carrier.

12 Claims, 6 Drawing Sheets

PLANETARY GEAR UNIT AND IMAGE FORMING APPARATUS INCLUDING SAME

CROSS-REFERENCE TO RELATED APPLICATIONS

The present patent application is based on and claims priority pursuant to 35 U.S.C. §119 from Japanese Patent Application Nos. 2011-019643, filed on Feb. 1, 2011 and 2011-245510, filed on Nov. 9, 2011, both in the Japan Patent Office, each of which is incorporated by reference herein in its entirety.

BACKGROUND OF THE INVENTION

1. Field of the Invention

Exemplary aspects of the present invention generally relate to a planetary gear unit and an image forming apparatus including the planetary gear unit.

2. Description of the Related Art

Related-art image forming apparatuses, such as copiers, printers, facsimile machines, and multifunction devices having two or more of copying, printing, and facsimile functions, typically form a toner image on a recording medium (e.g., a sheet of paper, etc.) according to image data using an electrophotographic method. In such a method, for example, a charger charges a surface of an image carrier (e.g., a photoconductor); an irradiating device emits a light beam onto the charged surface of the photoconductor to form an electrostatic latent image on the photoconductor according to the image data; a developing device develops the electrostatic latent image with a developer (e.g., toner) to form a toner image on the photoconductor; a transfer device transfers the toner image formed on the photoconductor onto a sheet of recording media; and a fixing device applies heat and pressure to the sheet bearing the toner image to fix the toner image onto the sheet. The sheet bearing the fixed toner image is then discharged from the image forming apparatus.

There are many rotary bodies used in the image forming apparatus. Examples of the rotary bodies include, but are not limited to, the photoconductor, a drive roller that drives belt members such as an intermediate transfer belt and a transfer belt, both included in the transfer device, and a conveyance roller that conveys the sheet or the like. A change in rotary speed of the photoconductor or the intermediate transfer belt, for example, causes jitter or uneven image density in a resultant image. Consequently, continuous speed fluctuation in the photoconductor or the intermediate transfer belt at a certain frequency periodically causes uneven image density throughout the resultant image, resulting in stripes, or banding. In addition, speed fluctuation in the photoconductor shifts a sub-scanning position of an exposure line from a writing system and a sub-scanning position upon primary transfer of a toner image from the photoconductor onto the intermediate transfer belt. Further, speed fluctuation in the intermediate transfer belt shifts a sub-scanning position upon secondary transfer of the toner image from the intermediate transfer belt onto the sheet as well as upon primary transfer of the toner image, thereby causing banding. Thus, speed fluctuation in the photoconductor and the intermediate transfer belt considerably degrades image quality.

Therefore, steady, consistent driving of these bodies is important for good imaging, and accordingly, there is a long-standing need for a mechanism that transmits torque with less rotational fluctuation from a drive source to a target rotary body to be driven to meet the requirement for highly accurate driving of the rotary body.

Plastic gears manufactured by injection molding of molten resin have been used as drive transmission members that transmit the torque from the drive source to the photoconductor or the intermediate transfer belt, each of which is required to be accurately driven. The plastic gears are superior to metal gears due to their higher self-lubricating property, lower noise during operation, lighter weight, superior corrosion resistance, and easier mass producibility. At the same time, however, plastic gears are inferior to the metal gears in terms of lower durability, lower dimensional accuracy, and lower rigidity.

In order to achieve sufficient durability for plastic gears, use of a planetary gear mechanism has been proposed. The planetary gear mechanism includes a sun gear rotated by torque from a drive source, an outer gear having inward-facing teeth and disposed coaxially with the sun gear, and multiple planetary gears provided within the outer gear at equal intervals along the inner circumference of the outer gear to respectively engage the sun gear and the outer gear. The planetary gear mechanism further includes carrier pins that rotatably support the planetary gears and a carrier that supports the carrier pins and is rotatable coaxially with the sun gear and the outer gear. The torque from the drive source rotates the sun gear so that the multiple planetary gears are rotated around their own axes while using the carrier pins as support shafts. At the same time, the multiple planetary gears revolve around the sun gear within the outer gear to rotate the carrier. The torque generated by rotation of the carrier is transmitted to the rotary body via an output shaft connected to both the carrier and the rotary body. Thus, use of the multiple planetary gears in the planetary gear mechanism diversifies rotational loads, thereby achieving the necessary durability.

Each of the carrier pins rotatably supporting the planetary gear is supported by the carrier at both ends thereof to be prevented from being tilted by the force acting on the carrier pins. Specifically, each of the carrier pins is inserted into both an output support hole provided to an output-side lateral plate of the carrier and an input support hole provided to an input-side lateral plate of the carrier, thereby being supported by the carrier at both ends thereof. Because of their self-lubricating property, the plastic planetary gears are directly supported by the carrier pins without ball bearings or the like to slidably rotate relative to the carrier pins. Each of the carrier pins is formed of metal in order to obtain the necessary stiffness and slidability against the planetary gears.

Revolution of the planetary gears around the sun gear pushes the carrier pins in a radial direction to rotate the carrier via the carrier pins. Consequently, contact pressure between the carrier pins and the planetary gears is increased. As a result, a frictional force between the planetary gears and the carrier pins is also increased, thereby increasing the force applied to the carrier pins in the direction of rotation of the carrier. An increase in operational load also increases the force applied to the carrier pins in the direction of rotation of the carrier. Consequently, the carrier pins are rotated, thereby possibly degrading rotational accuracy of the planetary gear mechanism.

It is conceivable that both one end of each of the carrier pins and each of the support holes provided to the carrier to support the one end of the carrier pin are D-shaped in cross-section so that the carrier pins are supported by the carrier without being rotated. However, the D-shaped configuration degrades rotational accuracy of the planetary gears.

Upon close examination, the inventors of the present invention have discovered that when the carrier pin was supported by the support hole such that a linear portion of the D-shaped end of the carrier pin is positioned downstream in the direction of rotation of the carrier, the carrier pin was tilted during rotation of the planetary gear mechanism, thereby degrading rotational accuracy of the planetary gears. The reason is that a gap was generated between the linear portion of the D-shaped end of the carrier pin and a linear portion of the D-shaped support hole due to finishing errors during processing of the end of the carrier pin formed of metal in a D-shape. Consequently, when the carrier pin is supported by the support hole such that the linear portion of the D-shaped end of the carrier pin is positioned downstream in the direction of rotation of the carrier, a force generated by revolution of the planetary gears around the sun gear is applied to the carrier pin and moves the D-shaped end of the carrier pin within the support hole, thereby contacting the linear portion of the D-shaped end of the carrier pin and the support hole. As a result, the carrier pin is tilted, resulting in deterioration of rotational accuracy of the planetary gears.

BRIEF SUMMARY OF THE INVENTION

In view of the foregoing, illustrative embodiments of the present invention provide a novel planetary gear unit that prevents rotation of a carrier pin and deterioration in rotational accuracy of planetary gears caused by inclination of the carrier pin. Illustrative embodiments of the present invention further provide a novel image forming apparatus including the planetary gear unit.

In one illustrative embodiment, a planetary gear unit includes a sun gear rotatable by torque from a drive source, an outer gear disposed coaxially with the sun gear, multiple planetary gears disposed within the outer gear at equal intervals along an inner circumference of the outer gear to engage both the sun gear and the outer gear, respectively, a carrier pin to rotatably support each of the multiple planetary gears, and a carrier rotatable coaxially with both the sun gear and the outer gear to support both ends of the carrier pin. At least a first end of the carrier pin is constructed of a circular portion and a linear portion in cross-section to form a first supported part. The carrier has a first support part that engages or is fitted with the first supported part to support the first supported part. The first support part is formed to position the circular portion of the first supported part downstream from the linear portion in a direction of rotation of the carrier.

In another illustrative embodiment, an image forming apparatus includes an image carrier, a drive unit to rotatively drive the image carrier, the planetary gear unit described above which is coupled to both the image carrier and the drive unit to transmit torque from the drive unit reduced by the planetary gear unit to the image carrier, and an image forming unit to form an image on the image carrier.

Additional features and advantages of the present disclosure will become more fully apparent from the following detailed description of illustrative embodiments, the accompanying drawings, and the associated claims.

BRIEF DESCRIPTION OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein.

DETAILED DESCRIPTION OF THE INVENTION

Figure 1:
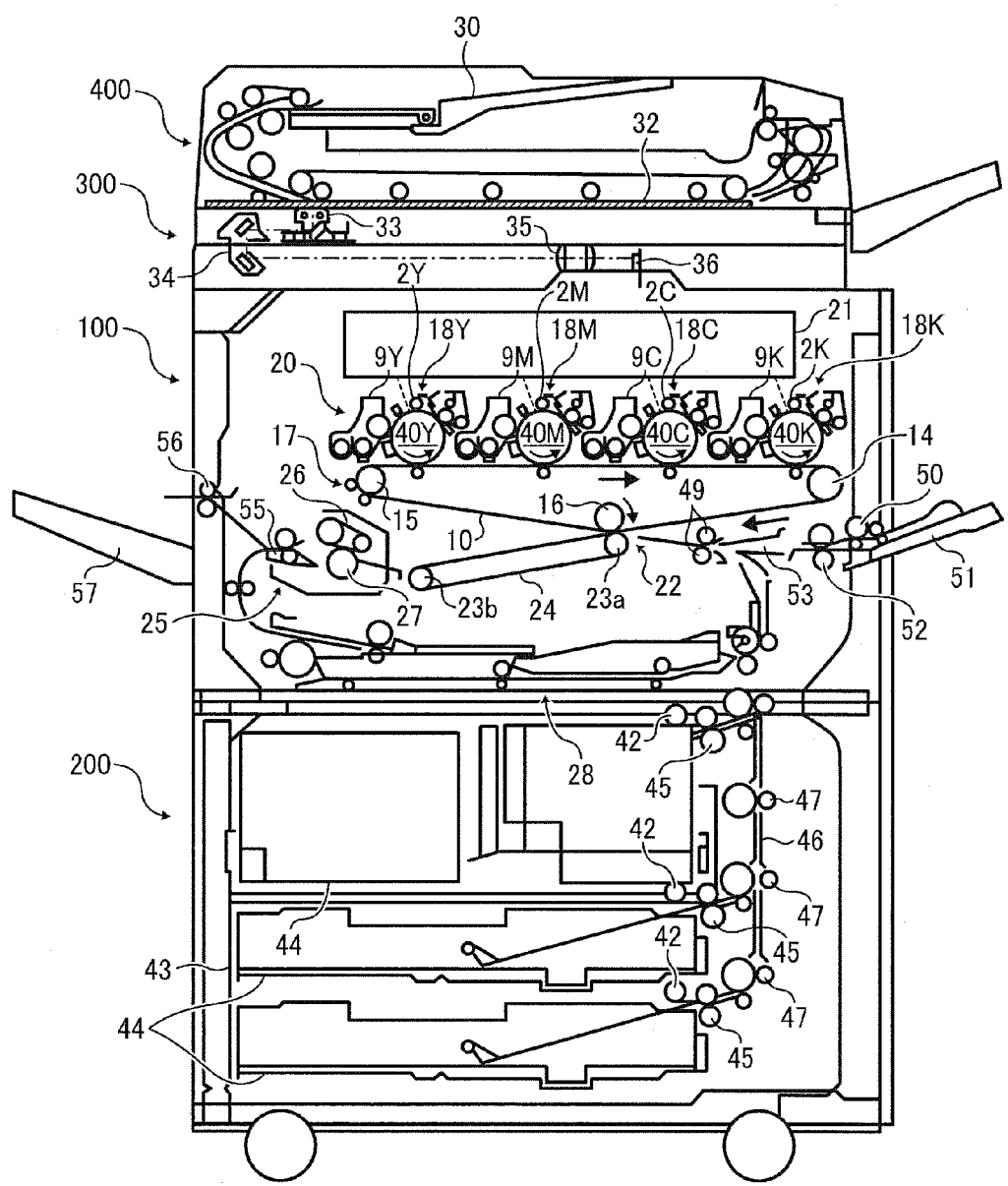
FIG. 1 is a vertical cross-sectional view illustrating an example of a configuration of an image forming apparatus according to an illustrative embodiment.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Illustrative embodiments of the present invention are now described below with reference to the accompanying drawings.

In a later-described comparative example, illustrative embodiment, and exemplary variation, for the sake of simplicity the same reference numerals will be given to identical constituent elements such as parts and materials having the same functions, and redundant descriptions thereof omitted unless otherwise required.

A description is now given of a configuration and operation of an image forming apparatus 100 including a planetary gear unit 80 according to an illustrative embodiment. In the present specification, the image forming apparatus 100 is a tandem-type electrophotographic copier employing an intermediate transfer system.

FIG. 1 is a vertical cross-sectional view illustrating an example of a configuration of the image forming apparatus 100. The image forming apparatus 100 includes a sheet feeder 200 provided at a lower portion of the image forming apparatus 100, a scanner 300 provided at an upper portion of the image forming apparatus 100, an automatic document feeder (ADF) 400 provided above the scanner 300, and so forth.

An image carrier, which, in the present illustrative embodiment, is an intermediate transfer belt 10, is provided substantially at the center in the body of the image forming apparatus 100. The intermediate transfer belt 10 is wound around first, second, and third support rollers 14, 15, and 16 and is rotated in a clockwise direction in FIG. 1. In the present illustrative embodiment, the third support roller 16 is a driven roller. A belt cleaning device 17 that removes residual toner from the intermediate transfer belt 10 after transfer of a toner image formed on the intermediate transfer belt 10 onto a recording medium such as a sheet of paper is provided opposite the second support roller 15 with the intermediate transfer belt 10 interposed therebetween. The image forming apparatus 100 further includes an image forming part 20 provided opposite a part of the intermediate transfer belt 10 extended between the first and second support rollers 14 and 15. In the image forming part 20, four image forming units 18Y, 18M, 18C, and 18K (hereinafter collectively referred to as image forming units 18), each forming an image of a specific color, that is, yellow (Y), magenta (M), cyan (C), or black (K), are disposed side by side along a direction of rotation of the intermediate transfer belt 10. A latent image forming unit, which, in the present illustrative embodiment, is an irradiating device 21, is provided above the image forming part 20.

A secondary transfer device 22 is provided opposite the image forming part 20 across the intermediate transfer belt 10. In the secondary transfer device 22, a secondary transfer belt 24 that conveys the sheet is wound around rollers 23a and 23b. The secondary transfer belt 24 is pressed against the third support roller 16 via the intermediate transfer belt 10. The secondary transfer device 22 transfers the toner image formed on the intermediate transfer belt 10 onto the sheet. A fixing device 25 that fixes the transferred toner image onto the sheet is provided downstream from the secondary transfer device 22 in a direction of conveyance of the sheet. In the fixing device 25, a pressure roller 27 is pressed against a fixing belt 26. In addition to the function of transferring the toner image onto the sheet, the secondary transfer device 22 also has a function of conveying the sheet having the transferred toner image thereon to the fixing device 25. In place of the secondary transfer belt 24, a transfer roller or a contactless charger may be disposed in the secondary transfer device 22. The image forming apparatus 100 further includes a reverse unit 28 provided parallel to the image forming part 20 below the secondary transfer device 22 and the fixing device 25. The reverse unit 28 reverses the sheet such that images are formed on both sides of the sheet.

To make a copy of a document using the image forming apparatus 100, first, the document is placed on a document stand 30 provided to the ADF 400. When a start button, not shown, is pressed, the document set on the ADF 400 is conveyed onto a contact glass 32 of the scanner 300, and then the scanner 32 is driven. Alternatively, the ADF 400 may be opened to set the document on the contact glass 32. Then, the ADF 400 is closed to press the document against the contact glass 32. In such a case, the scanner 300 is driven immediately after the start button is pressed. Next, first and second carriers 33 and 34 are driven. Light emitted from a light source provided to the first carrier 33 onto the document is reflected from the document, and the light thus reflected is directed onto the second carrier 34 to further reflect the light using a mirror provided to the second carrier 34 so that the light enters a reading sensor 36 through an imaging lens 35. As a result, the reading sensor 36 reads image data of the document.

Meanwhile, the third support roller 16 is rotatively driven by a drive source such as a drive motor, not shown. Accordingly, the intermediate transfer belt 10 is rotated in the clockwise direction in FIG. 1, and the first and second support rollers 14 and 15 are rotated as the intermediate transfer belt 10 rotates. At the same time, image carriers, which, in the present illustrative embodiment, are photoconductors 40Y, 40M, 40C, and 40K (hereinafter collectively referred to as photoconductors 40) respectively provided to the image forming units 18, are rotated in a counterclockwise direction in FIG. 1. Light is directed from the irradiating device 21 onto surfaces of the photoconductors 40 evenly charged by chargers 2Y, 2M, 2C, and 2K (hereinafter collectively referred to as chargers 2) based on the image data. Accordingly, electrostatic latent images of the specified colors are formed on the surfaces of the photoconductors 40, respectively. The electrostatic latent images are developed with toner by developing devices 9Y, 9M, 9C, and 9K (hereinafter collectively referred to as developing devices 9) so that toner images of the specified colors are formed on the surfaces of the photoconductors 40, respectively. It is to be noted that, in the present illustrative embodiment, an image forming unit that forms an image on the image carrier is constructed of the chargers 2, the developing devices 4, and the irradiating device 21 in a case in which the image carrier is the photoconductors 40. Meanwhile, the image forming unit is the image forming part 20 in a case in which the image carrier is the intermediate transfer belt 10.

The toner images thus formed on the surfaces of the photoconductors 40 are sequentially transferred onto the intermediate transfer belt 10 and superimposed one atop the other to form a single full-color toner image on the intermediate transfer belt 10.

In parallel with formation of the full-color toner image described above, one of sheet feed rollers 42 provided to the sheet feeder 200 is selectively rotated to feed sheets from one of sheet feed cassettes 44 provided one above another in a sheet bank 43. A separation roller 45 provided for each of the sheet feed cassettes 44 separates the sheets one by one to convey each sheet to a sheet feed path 46. The sheet is conveyed by conveyance rollers 47 through the sheet feed path 46 to a pair of registration rollers 49. The pair of registration rollers 49 temporarily stops conveyance of the sheet. Alternatively, a sheet may be fed from a manual sheet feed tray 51. In such a case, a manual sheet feed roller 50 is rotated to feed sheets stored on the manual sheet feed tray 51. A separation roller 52 separates the sheets one by one to convey each sheet to the pair of registration rollers 49 through a sheet feed path 53 so that conveyance of the sheet is temporarily stopped by the pair of registration rollers 49. The pair of registration rollers 49 is rotated in synchronization with the full-color toner image formed on the intermediate transfer belt 10 so that the full-color toner image is transferred by the secondary transfer device 22 onto the sheet conveyed between the intermediate transfer belt 10 and the secondary transfer device 22. The sheet having the transferred full-color toner image thereon is then conveyed to the fixing device 25 by the secondary transfer belt 24. In the fixing device 25, heat and pressure are applied to fix the full-color toner image to the sheet. A switching pick 55 changes direction of conveyance of the sheet so that the sheet having the fixed full-color toner image thereon is discharged to a discharge tray 57 by a discharge roller 56. During duplex printing, the switching pick 55 changes the direction of conveyance of the sheet to guide the sheet to the reverse unit 28. The sheet is reversed by the reverse unit 28 and is guided again to a transfer position formed between the intermediate transfer belt 10 and the secondary transfer device 22. Accordingly, a full-color toner image is transferred onto a back side of the sheet from the intermediate transfer belt 10 by the secondary transfer device 22. The sheet is then conveyed to the fixing device 25 to fix the full-color toner image on the back side of the sheet in a similar manner as described above, and is discharged to the discharge tray 57 by the discharge roller 56.

The belt cleaning device 17 removes residual toner from the intermediate transfer belt 10 after transfer of the full-color toner image from the intermediate transfer belt 10 onto the sheet to be ready for the next sequence of image formation performed by the image forming part 20. Although the pair of registration rollers 49 is generally grounded, alternatively, a bias may be applied to the pair of registration rollers 49 to remove paper dust.

During monochrome image formation, the photoconductors 40Y, 40M, and 40C are separated from the intermediate transfer belt 10 by a separation unit, not shown, and driving of those photoconductors 40Y, 40M, and 40C are temporarily stopped. Thus, only the photoconductor 40K contacts the intermediate transfer belt 10 so that a black toner image formed on the surface of the photoconductor 40K is transferred onto the intermediate transfer belt 10.

Figure 2:
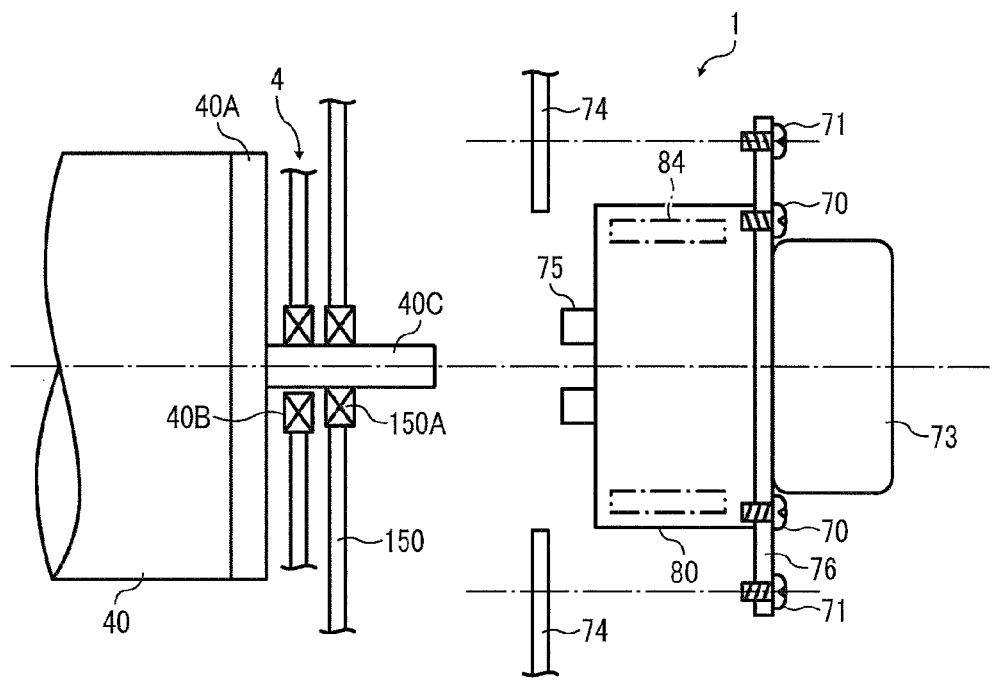
FIG. 2 is a vertical cross-sectional view illustrating an example of a configuration of a drive unit including a planetary gear unit according to the illustrative embodiment.

With reference to FIG. 2, a description is now given of a configuration and operation of a drive unit 1 including the planetary gear unit 80 according to the illustrative embodiment.

FIG. 2 is a vertical cross-sectional view illustrating an example of a configuration of the drive unit 1 including the planetary gear unit 80. The photoconductors 40 are driven by the corresponding drive units 1 each having the same configuration. Therefore, only one of the drive units 1 is hereinafter shown as a representative example without the suffixes Y, C, M, and K, each representing the color of toner. It is to be noted that the drive units 1 are applicable not only to the photoconductors 40 but also to other rotary bodies such as the third support roller 16 that drives the intermediate transfer belt 10.

A drum flange 40A and a drum shaft 40C, both rotatively supporting the photoconductor 40, are fixed to an end of the photoconductor 40 in an axial direction. The drum shaft 40C is rotatively supported by a drum bearing 40B mounted to a photoconductor unit 4 that accommodates the photoconductor 40, the charger 2, the developing device 9, a cleaning device, a neutralizing device, and so forth. The drum shaft 40C is also rotatively supported by a bearing 150A provided to a lateral plate 150 of the image forming apparatus 100 so that torque is transmitted from an output shaft of the planetary gear unit 80 supported by a drive lateral plate 74 to the drum shaft 40C via a cylindrical shaft 75. The drum unit 4 is detachably attachable to the lateral plate 150 and is guided to a predetermined position by a guide member, not shown, upon attachment to the lateral plate 150. The cylindrical shaft 75 is configured such that the drum shaft 40C is easily attached to or detached from the cylindrical shaft 75, thereby facilitating replacement of the photoconductor 40. The planetary gear unit 80 is fixed to the drive lateral plate 74 with screws 71. In the planetary gear unit 80, an outer gear 84 is fixed to a motor flange 76 via an outer gear flange 94, which is described later with reference to FIG. 3, with screws 70 so as not to be rotatable. A motor 73 is fixed to a surface of the motor flange 76 opposite a surface to which the outer gear 84 is fixed. Thus, the outer gear 84 is fixed to the motor flange 76 and isolated from the motor 73.

Figure 3:
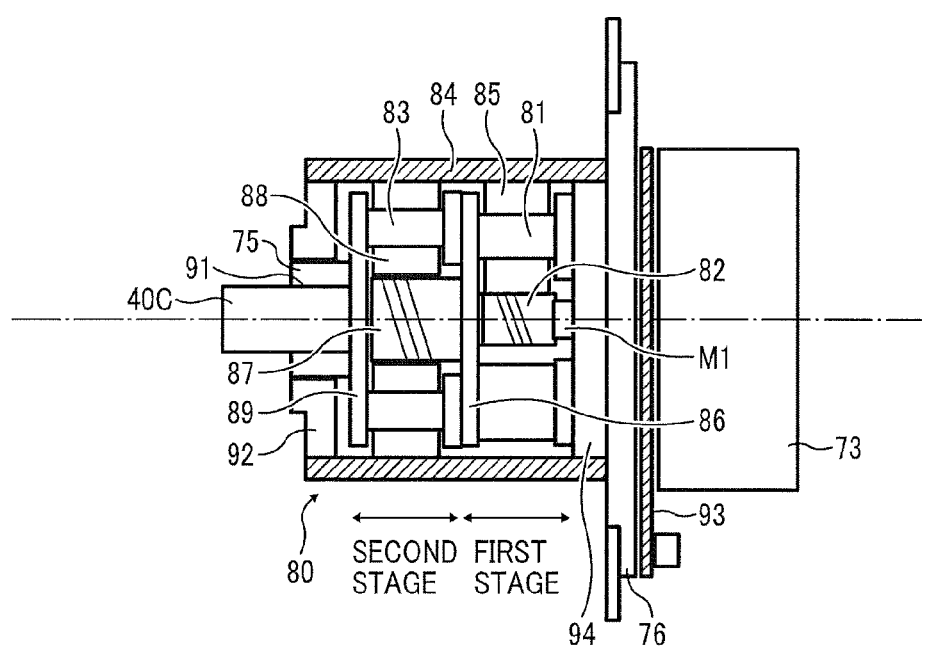
FIG. 3 is a vertical cross-sectional view illustrating an example of a configuration of the planetary gear unit.

The planetary gear unit 80 used for the drive unit 1 has a 2 KH-type two-stage structure as illustrated in FIG. 3. As a result, a widely used outer-rotor DC motor is used to set optimal reduction ratios, thereby achieving highly efficient and accurate drive control. FIG. 3 is a vertical cross-sectional view illustrating an example of a configuration of the planetary gear unit 80.

Each stage in an ordinary 2 KH-type planetary gear mechanism includes a sun gear, multiple planetary gears, a carrier that supports orbital motion or revolution of the multiple planetary gears around the sun gear, and an outer gear having inward-facing teeth.

One of rotation of the sun gear, revolution of the planetary gears around the sun gear (or rotation of the carrier), and rotation of the outer gear is held stationary, and one of the two remaining components is an input that provides power to the planetary gear mechanism, while the last component is an output that receives power from the mechanism. Setting of multiple reduction ratios and switching of directions of rotation and revolution of the gears are achieved depending on how the above-described three components are assigned. The 2 KH-type two-stage planetary gear mechanism is classified as a compound planetary gear mechanism having multiple 2 KH-type planetary gear mechanisms, and each of the multiple 2 KH-type planetary gear mechanisms includes three reference shafts. Two of the three reference shafts are coupled to each other while the remaining reference shaft is held stationary. One of the two reference shafts coupled to each other serves as an input shaft or an output shaft.

Figure 4A:
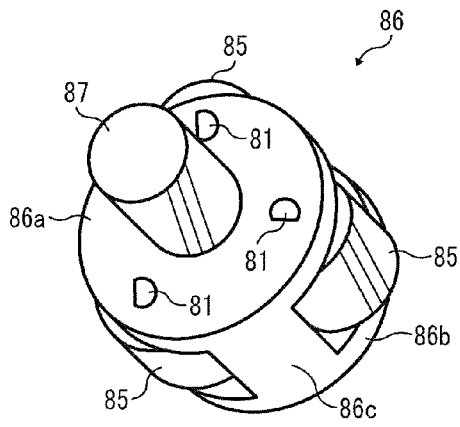
FIG. 4A is a perspective view illustrating an example of a configuration of a first carrier included in the planetary gear unit.

A first sun gear 82 for the first stage in the planetary gear unit 80 is provided, as a single integrated unit, to an input shaft of the planetary gear unit 80 provided to an output shaft M1 of the motor 73. First planetary gears 85, each engaging both the first sun gear 82 and the outer gear 84 fixed to the outer gear flange 94, are supported by a first carrier 86 to revolve around the first sun gear 82, respectively. The first planetary gears 85 are arranged within the outer gear 84 at equal intervals along the inner circumference of the outer gear 84 for the purpose of equalizing rotary balance and torque distribution. In the present illustrative embodiment, the three first planetary gears 85 are provided within the outer gear 84 at equal intervals along the inner circumference of the outer gear 84 as illustrated in FIG. 4A. FIG. 4A is a perspective view illustrating an example of a configuration of the first carrier 86 included in the planetary gear unit 80.

While engaging the first sun gear 82 to rotate around their own axes, the first planetary gears 85 also engage the outer gear 84 to revolve around the first sun gear 82 within the outer gear 84. In other words, each of the first planetary gears 85 engages the first sun gear 82 in an inner orbit as well as the outer gear 84 in an outer orbit while revolving around the first sun gear 82. The first carrier 86 that rotatably supports the first planetary gears 85 is rotated by revolution of the first planetary gears 85 around the first sun gear 82 at reduced speed relative to rotation of the first sun gear 82, so that a reduction ratio for the first stage is obtained.

A second stage in the planetary gear unit 80 includes a second sun gear 87 provided at the center of rotation of the first carrier 86 of the first stage. Thus, the second sun gear 87 is an input for the second stage in the planetary gear unit 80 and is rotated by rotation of the first carrier 86. There is no supporter that rotatively supports the first carrier 86. Therefore, the first carrier 86 is rotated floatingly.

Figure 4B:
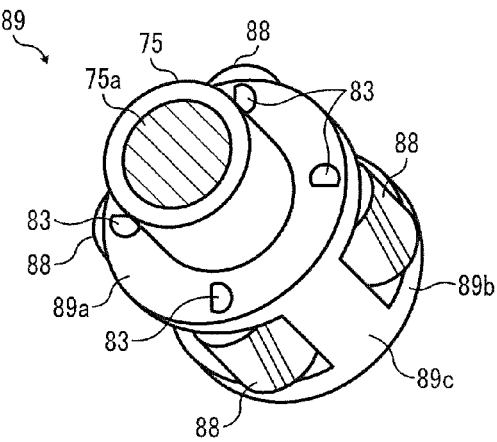
FIG. 4B is a perspective view illustrating an example of a configuration of a second carrier included in the planetary gear unit.

While engaging the second sun gear 87 to rotate around their own axes, four second planetary gears 88 also engage the outer gear 84, which is used for both the first and second stages in the planetary gear unit 80, to revolve around the second sun gear 88 within the outer gear 84. In other words, each of the second planetary gears 88 engages the second sun gear 87 in an inner orbit as well as the outer gear 84 in an outer orbit while revolving around the second sun gear 87. A second carrier 89 that rotatably supports the second planetary gears 88 is rotated by revolution of the second planetary gears 88 around the second sun gear 87 at reduced speed relative to rotation of the second sun gear 87, so that a reduction ratio for the second stage is obtained. An output unit is provided to the second carrier 89 in the second stage, that is, the last stage in the planetary gear unit 80, and splined inner teeth 75a are formed in an inner circumference of the cylindrical shaft 75 as illustrated in FIG. 4B. FIG. 4B is a perspective view illustrating an example of a configuration of the second carrier 89 included in the planetary gear unit 80. Splined outer teeth are provided to the drum shaft 40C of the photoconductor 40 to form a splined portion 91 that engages the splined inner teeth 75a of the cylindrical shaft 75. In the present illustrative embodiment, the splined portion 91 is used as the output unit.

The reduction ratio obtained in the 2 KH-type planetary gear unit 80 is calculated by Formula 1 below, where the number of teeth of each of the first and second sun gears 82 and 87 is Za, the number of teeth of each of the first and second planetary gears 85 and 88 is Zb, and the number of teeth of the outer gear 84 is Zc. Suffixes "1" and "2" in Formula 1 below indicate the first and second stages in the planetary gear unit 80, respectively.

$$\text{Reduction Ratio} = Za1/(Za1+Zc1) \times Za2/(Za2+Zc2) \quad \text{[Formula 1]}$$

The output shaft M1 of the motor 73 is supported by the motor flange 76 via two bearings to support an outer-type rotor, which is a rotor of a DC brushless motor. A stator core of the motor 73, not shown, a motor drive circuit substrate 93, and so forth are also provided to the motor flange 76.

The outer gear flange 94 having the outer gear 84 is fixed to the motor flange 76 with screws, not shown. Alternatively, the outer gear flange 94 and the motor flange 76 may be formed together as a single integrated unit.

The motor flange 76 is formed of a metal plate having a thickness of about 5 mm to provide sufficient strength. The first sun gear 82 is formed in the output shaft M1 of the motor 73. In order to secure accurate coaxial alignment of the first sun gear 82 and the outer gear 84, the outer gear 84 and the motor flange 76 are positioned relative to each other by engagement of a mating structure.

An end cap 92 is provided to an end of the outer gear 84 opposite the motor flange 76 with screws, not shown.

The end cap 92 prevents the first and second planetary gears 85 and 88, the first and second carriers 86 and 89, and the cylindrical shaft 75, each provided within the outer gear 84, from dropping off from the outer gear 84 upon installation of the planetary gear unit 80 to the drive lateral plate 74. There is an enough clearance between the end cap 92 and the cylindrical shaft 75 so that the end cap 92 does not rotatively support the second carrier 89 and the second carrier 89 is floatingly rotated.

The drum flange 40A is fixed to the end of the photoconductor 40 and is rotatable together with the photoconductor 40.

The drum shaft 40C is rotatively supported by the drum bearing 40B provided to the drum unit 4 that accommodates the photoconductor 40. As described previously, the drum unit 4 is detachably attachable to the lateral plate 150 of the image forming apparatus 100 and is guided to a predetermined position by the guide member upon attachment to the lateral plate 150.

The lateral plate 150 has the bearing 150A into which the drum bearing 40B is inserted, and the drum unit 4 is positioned relative to the lateral plate 150 by two positioning pins, not shown. A support part of the drum bearing 40B and the lateral plate 150 are fitted with each other using a fitting structure to secure axial accuracy of the photoconductor 40 and the planetary gear unit 80 included in the drive unit 1.

The drum shaft 40C and the cylindrical shaft 75 respectively have a splined shape, that is, the splined portion 91 and the splined inner teeth 75a, at a fitting part in which the drum shaft 40C and the cylindrical shaft 75 are fitted with each other. Accordingly, the drum shaft 40C of the photoconductor 40 can be detached from the cylindrical shaft 75 provided to the second carrier 89 by simply pulling out the drum unit 4 from the lateral plate 150 in the axial direction of the photoconductor 40. In other words, the splined portion 91 of the drum shaft 40C, which is used as the output unit, is easily attached to or detached from the second carrier 89.

Coupling of splined gears is used to couple the drum shaft 40C to the cylindrical shaft 75 provided to the second carrier 89 that outputs the torque of the planetary gear unit 80, thereby further reducing rotational fluctuation caused by eccentricity error of the planetary gears. As a result, rotary speed fluctuation of the photoconductor 40 is considerably reduced, thereby providing higher-quality images.

As illustrated in FIG. 4A, the first carrier 86 supports first carrier pins 81, each supporting the first planetary gears 85, at both ends of each of the carrier pins 81 by two lateral plates, that is, an output lateral plate 86a disposed closer to the photoconductor 40 and an input lateral plate 86b disposed opposite the output lateral plate 86a and closer to the motor 73. The output and input lateral plates 86a and 86b are fixed to each other by three carrier supports 86c provided between the three first planetary gears 85, respectively. Revolution of the first planetary gears 85 around the first sun gear 82 rotates the first carrier 86 to transmit the torque to the second sun gear 87 coaxially provided to the output lateral plate 86a of the first carrier 86.

As illustrated in FIG. 4B, the second carrier 89 has the same configuration as the first carrier 86 illustrated in FIG. 4A, except that the four second planetary gears 88, four second carrier pins 83, and four carrier supports 89c are provided. In addition, the cylindrical shaft 75 is coaxially provided to an output lateral plate 89a of the second carrier 89. It is to be noted that, in FIG. 4B, reference numeral 89b denotes an input lateral plate of the second carrier 89.

Load in a radial direction for rotating the first and second carriers 86 and 89 is generated in each of the first and second carrier pins 81 and 83. When each of the first and second carrier pins 81 and 83 is supported at only one end thereof, the first and second carrier pins 81 and 83 tend to tilt due to the load in the radial direction, thereby degrading accurate transmission of the torque. In particular, the first and second carrier pins 81 and 83 are easily tilted when the first and second carriers 86 and 89, to which the first and second carrier pins 81 and 83 are fixed, respectively, are formed of resin. In the present illustrative embodiment, each of the first and second carrier pins 81 and 83 is supported at both ends thereof as described above. Accordingly, the first and second carrier pins 81 and 83 are prevented from tilting even when the first and second carriers 86 and 89 are formed of resin, thereby accurately transmitting the torque. In addition, formation of the first and second carriers 86 and 89 of resin using injection molding achieves mass production at reduced costs.

Figure 5A:
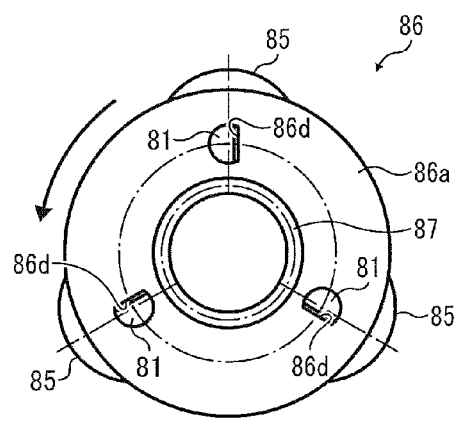
FIG. 5A is a schematic view illustrating an example of a configuration of the first carrier viewed from an output side.
Figure 5B:
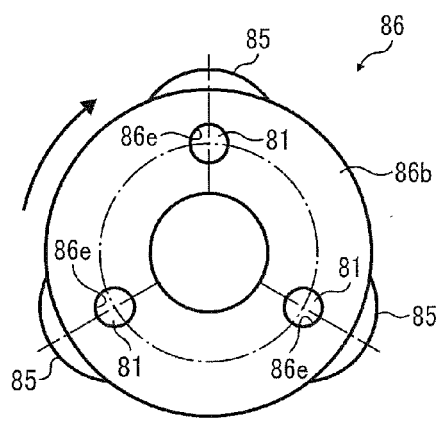
FIG. 5B is a schematic view illustrating an example of a configuration of the first carrier viewed from an input side.
Figure 6:
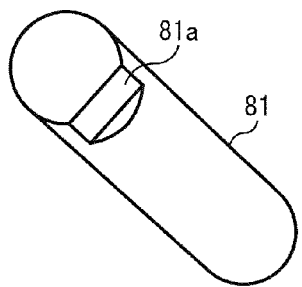
FIG. 6 is a perspective view illustrating an example of a configuration of a first carrier pin according to the illustrative embodiment.

FIG. 5A is a schematic view illustrating an example of a configuration of the first carrier 86 viewed from the output lateral plate 86*a*. FIG. 5B is a schematic view illustrating an example of a configuration of the first carrier 86 viewed from the input lateral plate 86*b*. FIG. 6 is a perspective view illustrating an example of a configuration of the first carrier pin 81.

As illustrated in FIG. 5A, the output lateral plate 86*a* of the first carrier 86 has three D-shaped first support portions, which, in the present illustrative embodiment, are three output support holes 86*d*, disposed at equal intervals in the direction of rotation of the first carrier 86. A first supported portion of each of the carrier pins 81, which, in the present illustrative embodiment, is an output end of each of the first carrier pins 81, is inserted into the support holes 86*d*, respectively. The top of a circular portion of each of the D-shaped output support holes 86*d* is positioned on the extreme downstream side in the direction of rotation of the first carrier 86 and a linear portion of each of the D-shaped output support holes 86*d* is positioned on the extreme upstream side.

As illustrated in FIG. 5B, the input lateral plate 86*b* of the first carrier 86 has three second support portions, which, in the present illustrative embodiment, are input support holes 86*e*, disposed at equal intervals in the direction of rotation of the first carrier 86. A second supported portion, which, in the present illustrative embodiment, is an input end of each of the first carrier pins 81, is inserted into the input support holes 86*e* to be supported by the input support holes 86*e*, respectively. Each of the input support holes 86*e* has a circular shape having a diameter slightly larger than that of the first carrier pins 81. Alternatively, the first carrier pins 81 may be fitted into the input support holes 86*e*, respectively, using tight fit tolerance of the input support holes 86*e* in order to prevent dropout of the first carrier pins 81 from the input support holes 86*e* and enhance positional accuracy.

As illustrated in FIG. 6, each of the first carrier pins 81 has a columnar shape and is formed of metal in consideration of necessary stiffness and slidability against the first planetary gears 85. Accordingly, bending and deformation of the first carrier pins 81 can be prevented even when the first carrier pins 81 are pressed by the first planetary gears 85 in the radial direction, and the first planetary gears 85 are accurately rotated around their own axes. Specifically, a metal round bar is cut, and an outer circumference of the metal bar subjected to centerless grinding is used as is, or is subjected to turning to achieve required accuracy. A cutout is provided to the output end of each of the first carrier pins 81 using a milling machine so that the output end has a D-shape in cross-section. In addition, the first carrier pins 81 are plated or quenched, as needed.

The D-shaped output end of each of the first carrier pins 81 is inserted into the input support hole 86*e* and is moved in the axial direction to engage the output support hole 86*d*.

Figure 7A:
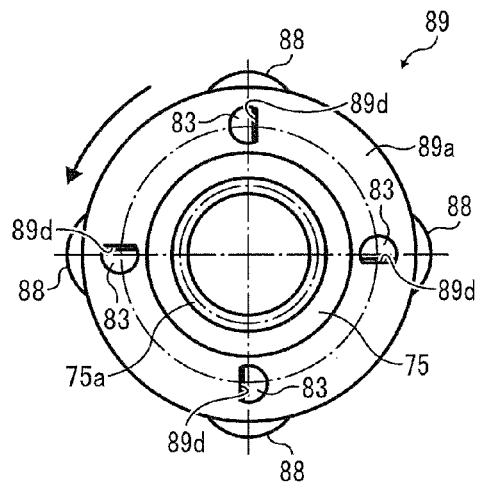
FIG. 7A is a schematic view illustrating an example of a configuration of the second carrier viewed from an output side.
Figure 7B:
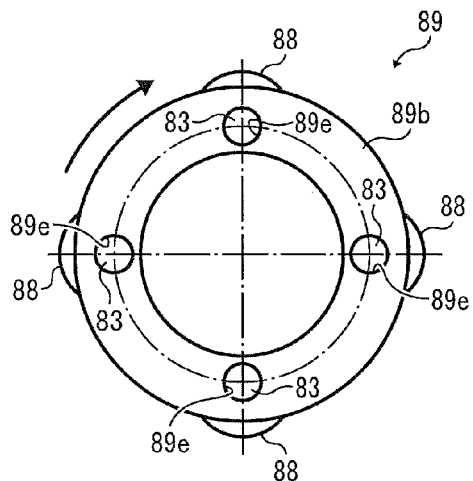
FIG. 7B is a schematic view illustrating an example of a configuration of the second carrier viewed from an input side.

FIG. 7A is a schematic view illustrating an example of a configuration of the second carrier 89 viewed from the output lateral plate 89*a*. FIG. 7B is a schematic view illustrating an example of a configuration of the second carrier 89 viewed from the input lateral plate 89*b*.

In a manner similar to the first carrier 86, each of four output support holes 89*d* formed in the output lateral plate 89*a* of the second carrier 89 to support an output end of each of the second carrier pins 83 also has a D-shape in cross-section as illustrated in FIG. 7A. The top of a circular portion of each of the D-shaped output support holes 89*d* is positioned on the extreme downstream side in the direction of rotation of the second carrier 89. As illustrated in FIG. 7B, each of four input support holes 89*e* formed in the input lateral plate 89*b* of the second carrier 89 to support an input end of each of the second carrier pins 83 also has a circular shape in a manner similar to the first carrier 86. It is to be noted that the second carrier pins 83 have the same configuration as the first carrier pins 81 illustrated in FIG. 6.

The first and second carriers 86 and 89 are formed of resin, and the lateral plates 86*a* and 86*b* or 89*a* and 89*b* and the carrier supports 86*c* or 89*c* are formed together with the first or second carrier 86 or 89 as a single integrated unit, respectively, using injection molding or the like. Both the output support holes 86*d* or 89*d* and the input support holes 86*e* or 89*e* are formed by a single core pin provided to a mold. Accordingly, the output support holes 86*d* or 89*d* and the input support holes 86*e* or 89*e* are accurately formed such that a line connecting the center of each of the output support holes 86*d* or 89*d* and the input support holes 86*e* or 89*e* is parallel to an axis of the first or second carrier 86 or 89.

Because the first or second planetary gears 85 or 88 are slidably rotated on the axes thereof against the first or second carrier pins 81 or 83, a force is generated on the first and second carrier pins 81 and 83 in the direction of rotation of the first and second planetary gears 85 and 88. In addition, revolution of the first or second planetary gears 85 or 88 around the first or second sun gear 82 or 87 pushes the first or second carrier pins 81 or 83 in the radial direction to rotate the first or second carrier 86 or 89 via the first or second carrier pins 81 or 83. Thus, contact pressure between the first carrier pins 81 and the first planetary gears 85 or the second carrier pins 83 and the second planetary gears 88 is increased, thereby increasing frictional force therebetween. Consequently, the force that rotates the first or second carrier pins 81 or 83 is increased, possibly resulting in rotation of the first or second carrier pins 81 or 83. Rotation of the first or second carrier pins 81 or 83 changes slide resistance between the first or second planetary gears 85 or 88 and the first or second carrier pins 81 or 83 and speed of rotation of the first or second planetary gears 85 or 88 on the axes thereof, thereby possibly degrading rotary accuracy.

However, in the present illustrative embodiment, the output end of each of the first and second carrier pins 81 and 83 and the output support holes 86*d* and 89*d* have a D-shape in cross-section, thereby preventing rotation of the first and second carrier pins 81 and 83. As a result, the planetary gear unit 80 is accurately rotated.

A description is now given of accuracy in processing the D-shaped output end of each of the first and second carrier pins 81 and 83.

Figure 8:
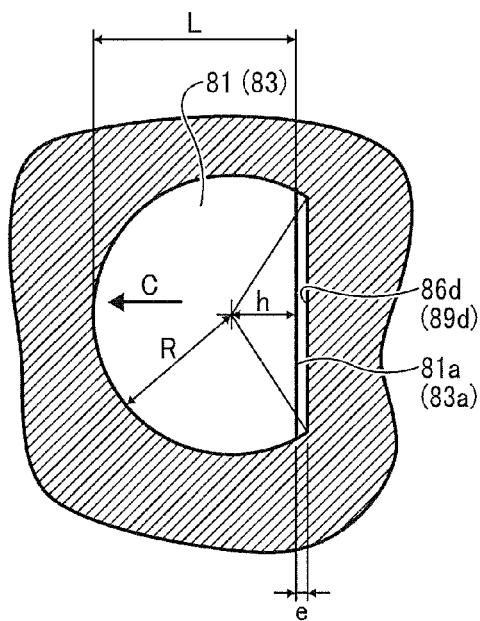
FIG. 8 is a schematic view illustrating engagement of an output support hole and an output end of the first or second carrier pin.

A metal round bar forming each of the first and second carrier pins 81 and 83 is subjected to centerless grinding so that an outer diameter of each of the first and second carrier pins 81 and 83 is accurately provided. Alternatively, turning may be used to achieve highly accurate processing of the first and second carrier pins 81 and 83. Both centerless grinding and turning can reduce finishing error to not greater than 10 µm even in consideration of quality variation due to mass-production. However, milling used for providing the cutout to the output end of each of the first and second carrier pins 81 and 83 cannot achieve processing as accurate as turning. Consequently, there is finishing error in a distance h between the center of the circular portion and a linear portion 81*a* or 83*a* in the D-shaped output end of each of the first and second carrier pins 81 and 83 as illustrated in FIG. 8. As a result, a distance L between the top of the circular portion and the linear portion 81*a* or 83*a* in the D-shaped output end of each of the first or second carrier pins 81 or 83 differs by about 50 µm in consideration of quality variation due to mass-production. In a case in which the shape of each of the output support holes 86*d* and 89*d* has substantially the same size as the output end of each of the first and second carrier pins 81 and 83 to fit the output end of each of the first and second carrier pins 81 and 83 into the output support holes 86*d* and 89*d*, respectively, the output end of each of the first and second carrier pins 81 and 83 may not be inserted into the output support holes 86*d* and 89*d*. Therefore, in the present illustrative embodiment, each of the output support holes 86*d* and 89*d* is sized in consideration of the maximum size of the finishing error in the linear portion 81*a* or 83*a* to loosely engage the output end of each of the first and second carrier pins 81 and 83 with the output support holes 86*d* and 89*d*, respectively. As a result, the output end of each of the first and second carrier pins 81 and 83 is securely inserted into the output support holes 86*d* and 89*d*, respectively. However, in such a case, a gap e is formed as an error between the linear portions 81*a* or 83*a* in the D-shaped output end of each of the first or second carrier pins 81 or 83 and a linear portion in each of the output support holes 86*d* or 89*d*, respectively, as illustrated in FIG. 8.

Figure 9:
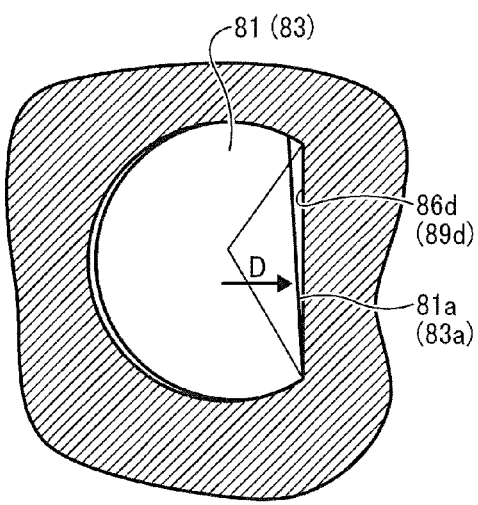
FIG. 9 is a schematic view illustrating movement of the output end of the first or second carrier pin within the output support hole when a linear portion of the output support hole is provided downstream in a direction of rotation of the first or second carrier.

The first and second planetary gears 85 and 88 are revolved around the first and second sun gear 82 and 87, respectively, by an engagement reaction force with the fixed outer gear 84, and the force that revolves the first and second planetary gears 85 and 88 is transmitted to the first and second carrier 86 and 89 via the first and second carrier pins 81 and 83 to rotate the first and second carrier 86 and 89, respectively. As a result, the force is applied to the first and second carrier pins 81 and 83 in the direction of revolution of the first and second planetary gears 85 and 88 (or the direction of rotation of the first and second carriers 86 and 89). At this time, when the linear portions of the D-shaped output support holes 86*d* and 89*d* are positioned downstream in the direction of rotation of the first and second carriers 86 and 89, respectively, the output ends of the first and second carrier pins 81 and 83 are moved in a direction indicated by arrow D in FIG. 9 toward the linear portions of the D-shaped output support holes 86*d* and 89*d*. Consequently, the first and second carrier pins 81 and 83 are tilted, thereby degrading rotational accuracy of the first and second planetary gears 85 and 88. An amount of movement of the output ends of the first and second carrier pins 81 and 83 within the output support holes 86*d* and 89*d* changes depending on finishing error in the linear portions 81*a* and 83*a*. By contrast, the input ends of the first and second carrier pins 81 and 83 are accurately sized in round shape and rarely moved within the input support holes 86*e* and 89*e*, respectively. Even when the input ends the first and second carrier pins 81 and 83 are moved within the input support holes 86*e* and 89*e*, an amount of movement of the input ends is substantially constant. Thus, fluctuation in the amount of movement of the output ends of the first and second carrier pins 81 and 83 due to the finishing error in the linear portions 81*a* and 83*a* tilts the first and second carrier pins 81 and 83 by an amount of finishing error in the linear portions 81*a* and 83*a*, thereby degrading rotational accuracy of the first and second planetary gears 85 and 88 and the planetary gear unit 80.

In the present illustrative embodiment, the output support holes 86*d* and 89*d* are provided to support the first and second carrier pins 81 and 83 such that the linear portions 81*a* and 83*a* of the D-shaped output ends of the first and second carrier pins 81 and 83 are positioned perpendicular to the direction of rotation of the first and second carriers 86 and 89, respectively. As a result, the top of the circular portions in the D-shaped output ends of the first and second carrier pins 81 and 83 are positioned on the extreme downstream side in the direction of rotation of the first and second carriers 86 and 89 as illustrated in FIGS. 5A and 7A, respectively. Specifically, the top of the circular portion of each of the D-shaped output support holes 86*d* and 89 is positioned on the extreme downstream side in the direction of rotation of the first and second carriers 86 and 89. Accordingly, the output support holes 86*d* and 89*d* support the output ends of the first and second carrier pins 81 and 83 such that the top of the circular portion in the D-shaped output end of each of the first and second carrier pins 81 and 83 is positioned on the extreme downstream side in the direction of rotation of the first and second carriers 86 and 89, respectively. As a result, the force is applied to the first and second carrier pins 81 and 83 in a direction indicated by arrow C in FIG. 8 during revolution of the first and second planetary gears 85 and 88 around the sun gears 82 and 87, respectively.

The circular portions in the D-shaped output ends of the first and second carrier pins 81 and 83 are accurately processed with less dimension error in a radius R of the circular portions. Therefore, even when a radius of the circular portions in the output support holes 86*d* and 89*d* are sized in consideration of the maximum finishing error in the circular portions in the output end of the first and second carrier pins 81 and 83, there is only a slight gap between the circular portions in the first and second carrier pins 81 and 83 and the circular portions in the output support holes 86*d* and 89*d*, respectively. As a result, the force applied to the first and second carrier pins 81 and 83 in the direction indicated by the arrow C in FIG. 8 rarely moves the output ends of the first and second carrier pins 81 and 83. Thus, the first and second carrier pins 81 and 83 are prevented from tilting, thereby accurately rotating the first and second planetary gears 85 and 88.

Further, in the present illustrative embodiment, the output support holes 86*d* and 89*d* are D-shaped, and the first and second carrier pins 81 and 83 are provided to the first and second carriers 86 and 89 by inserting the first and second carrier pins 81 and 83 from the input support holes 86*e* and 89*e*, respectively. The output lateral plate 86*a* of the first carrier 86 has an output unit protruding therefrom to output the torque of the first carrier 86, that is, the second sun gear 87. The output lateral plate 89*a* of the second carrier 89 also has an output unit protruding therefrom to output the torque of the second carrier 89, that is, the circular shaft 75. Consequently, when the first and second carrier pins 81 and 83 are configured to be inserted into the first and second carriers 86 and 89 from the output lateral plates 86*a* and 89*a*, respectively, the output units protruding from the output lateral plates 86*a* and 89*a* may prevent insertion of the first and second carrier pins 81 and 83 into the first and second carriers 86 and 89, respectively. By contrast, in the present illustrative embodiment, the first and second carrier pins 81 and 83 are configured to be inserted into the first and second carriers 86 and 89 from the input lateral plates 86*b* and 89*b*, respectively. Accordingly, installation of the first and second carrier pins 81 and 83 is facilitated compared to the case in which the first and second carrier pins 81 and 83 are configured to be inserted from the output lateral plates 86*a* and 89*a*, respectively.

Figure 10:
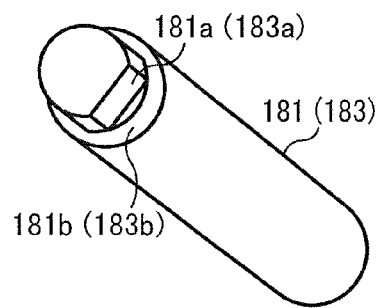
FIG. 10 is a perspective view illustrating an example of a configuration of a first or second carrier pin according to a first variation.
Figure 11:
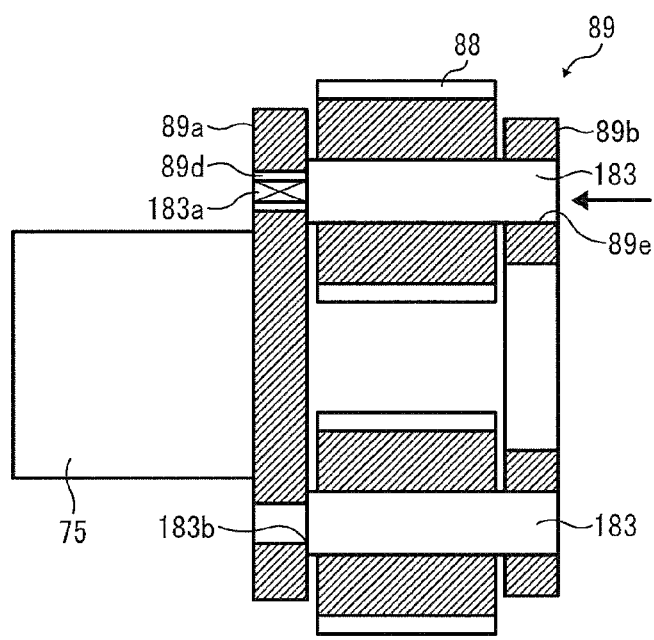
FIG. 11 is a vertical cross-sectional view illustrating an example of a configuration of a second carrier using the carrier pin illustrated in FIG. 10.

FIG. 10 is a perspective view illustrating an example of a configuration of a first or second carrier pin 181 or 183 according to a first variation. FIG. 11 is a vertical cross-sectional view illustrating an example of a configuration of the second carrier 89 using the second carrier pin 183 illustrated in FIG. 10.

The first or second carrier pin 181 or 183 illustrated in FIG. 10 has a stepped portion 181*b* or 183*b* in the output end thereof to reduce the diameter of the output end. The output end is milled to a D-shape. Reference numerals 181*a* and 183*a* in FIG. 10 denote linear portions in the D-shaped output ends of the first and second carrier pin 181 and 183, respectively.

As illustrated in FIG. 11, when the second carrier pin 183 is inserted into both the output and input support holes 89*d* and 89*e* of the second carrier 89, the stepped portion 183*b* of the second carrier pin 183 contacts the output lateral plate 89*a* of the second carrier 89, thereby positioning the second carrier pin 183 in the axial direction.

In addition, the reduced diameter of the output end of each of the first and second carrier pins 181 and 183 facilitates insertion of the first and second carrier pins 181 and 183 into the input support holes 86*e* and 89*e*, respectively. Further, the output support holes 86*d* and 89*d* are smaller than the input support holes 86*e* and 89*e*. Therefore, a mold core pin for forming the output support holes 86*d* and 89*d* and the input support holes 86*e* and 89*e* has a shape in which a portion for forming the output support holes 86*d* and 89*d* has a reduced diameter compared to a portion for forming the input support holes 86*e* and 89*e*. Accordingly, slide load of the mold core pin against an inner circumference of each of the input support holes 86*e* and 89*e* upon removal of the mold core pin can be reduced, thereby increasing durability of the mold core pin.

Figure 12:
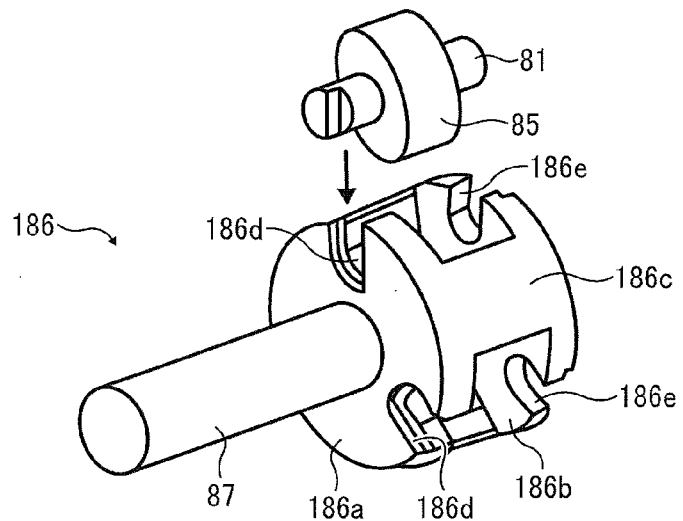
FIG. 12 is a perspective view illustrating an example of a configuration of a first carrier according to a second variation.

FIG. 12 is a perspective view illustrating an example of a configuration of a first carrier 186 according to a second variation.

The first carrier 186 according to the second variation has U-shaped slots that support the first carrier pin 81. Specifically, U-shaped engagement slots 186*d* and 186*e* that engage the first carrier pin 81 are provided in an output lateral plate 186*a* and an input lateral plate 186*b* of the first carrier 186 at three positions, respectively, at equal intervals in the direction of rotation of the first carrier 186. The engagement slots 186*d* and 186*e* engage the first carrier pins 81, each supporting the first planetary gears 85, so that each of the first carrier pins 81 is supported by the first carrier 186 at both ends thereof. It is to be noted that reference numeral 186*c* in FIG. 12 denotes a carrier support provided between the first planetary gears 85 at three positions, and the second carrier 89 may have the same configuration as that illustrated in FIG. 12.

Figure 13B:
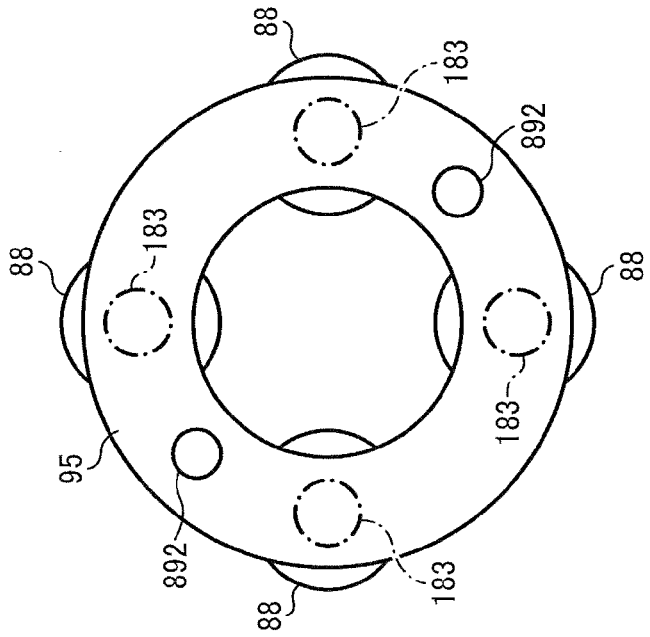
FIGS. 13A and 13B are vertical cross-sectional and schematic views respectively illustrating an example of a configuration of a second carrier provided with an axial plate according to a third variation.
Figure 13A:
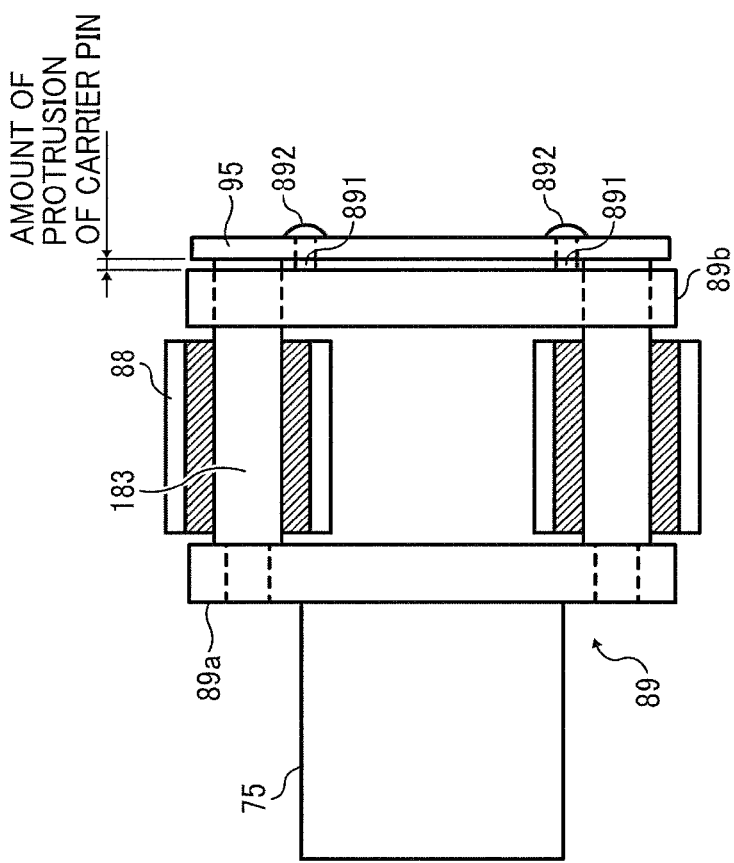

FIGS. 13A and 13B are vertical cross-sectional and schematic views respectively illustrating an example of a configuration of the second carrier 89 according to a third variation. In the third variation, the second carrier 89 further includes a stopper, which, in the present variation, is a ring-shaped axial plate 95 that prevents the second carrier pins 183 from dropping off from the output support holes 89*d*. It is to be noted that the second carrier pins 183 illustrated in FIG. 10 are used in the configuration illustrated in FIG. 13. In addition, the first carrier 86 may have the same configuration as the second carrier 89 illustrated in FIGS. 13A and 13B.

When each of the second planetary gears 88 has a helical structure, the second carrier pins 183 tend to drop off from the second carrier 89 due to a thrust force acting on the second planetary gears 88. When the thrust force acts on the second planetary gears 88 in a direction of output of the torque, the stepped portions 183*b* in the output ends of the second carrier pins 183 contact the output lateral plate 89*a* of the second carrier 89 so that movement of the second carrier pins 183 in the thrust direction is restricted, thereby preventing the second carrier pins 183 from dropping off from the second carrier 89. However, when the thrust force acts on the second planetary gears 88 in a direction of input of the torque, the output ends of the second carrier pins 183 may drop off from the output support holes 89*d*. Therefore, as illustrated in FIGS. 13A and 13B, the ring-shaped axial plate 95 is provided opposite the input ends of the second carrier pins 183 to prevent the second carrier pins 183 from dropping off from the output support holes 89*d* of the second carrier 89. The ring-shaped axial plate 95 is processed to superimpose on the input ends of the second carrier pins 183 and is fixed to the input lateral plate 89*b* of the second carrier 89. The axial plate 95 may be fixed to the input lateral plate 89*b* with a screw, glue, or by thermal caulking. In the example illustrated in FIGS. 13A and 13B, the axial plate 95 is fixed to the input lateral plate 89*b* by thermal caulking. Specifically, the second carrier 89 formed of resin has resin studs 891 at two different positions to fix the axial plate 95 by thermal caulking. In addition, two insertion holes are provided to the axial plate 95 opposite the studs 891, respectively. The studs 891 are inserted into the insertion holes to fit the axial plate 95 in the input lateral plate 89*b*. Then, the studs 891 protruding from the axial plate 95 are melted by heat to form swaged portions 892 so that the axial plate 95 is fixed to the input lateral plate 89*b* by thermal caulking. Although being fixed to the input lateral plate 89*b* at the two positions in the example illustrated in FIGS. 13A and 13B, alternatively, the axial plate 95 may be fixed to the input lateral plate 89*b* at four positions in total between the second carrier pins 183.

The second carrier pins 183 protrude from the input lateral plate 89*b* of the second carrier 89 to contact the axial plate 95 as illustrated in FIG. 13A. Accordingly, movement of the second carrier pins 183 in the thrust direction can be prevented by the axial plate 95, thereby providing the second carrier pins 183 to the second carrier 89 without looseness in the thrust direction.

In addition, provision of the axial plate 95 to the second carrier 89 prevents the second carrier pins 183 from sliding against the axial plate 95. Accordingly, the second carrier 89 is securely rotated.

Thus, use of the planetary gear unit 80 according to the illustrative embodiment can accurately drive the image carrier such as the photoconductors 40 and the intermediate transfer belt 10, thereby providing higher-quality images.

Elements and/or features of different illustrative embodiments may be combined with each other and/or substituted for each other within the scope of this disclosure and appended claims.

Illustrative embodiments being thus described, it will be apparent that the same may be varied in many ways. Such exemplary s are not to be regarded as a departure from the scope of the present invention, and all such s as would be obvious to one skilled in the art are intended to be included within the scope of the following claims.

The number of constituent elements and their locations, shapes, and so forth are not limited to any of the structure for performing the methodology illustrated in the drawings.

What is claimed is:

1. A planetary gear unit comprising:
a sun gear rotatable by torque from a drive source;
an outer gear disposed coaxially with the sun gear;
multiple planetary gears disposed within the outer gear at equal intervals along an inner circumference of the outer gear to engage both the sun gear and the outer gear, respectively;
a carrier pin to rotatably support each of the multiple planetary gears, at least a first end of the carrier pin being constructed of a circular portion and a linear portion in cross-section to form a first supported part; and
a carrier rotatable coaxially with both the sun gear and the outer gear to support both ends of the carrier pin, the carrier having a first support part that engages or is fitted with the first supported part to support the first supported part, the first support part being formed to position the circular portion of the first supported part downstream from the linear portion in a direction of rotation of the carrier.

2. The planetary gear unit according to claim 1, wherein the first support part supports the first supported part to position the linear portion of the first supported part perpendicular to the direction of rotation of the carrier.

3. The planetary gear unit according to claim 1, wherein:
the carrier pin is formed of metal; and
the multiple planetary gears and the carrier are formed of resin.

4. The planetary gear unit according to claim 1, wherein:
the first support part is a hole constructed of a circular portion and a linear portion in cross-section; and
the circular portion of the first support part is provided on an extreme downstream side in the direction of rotation of the carrier.

5. The planetary gear unit according to claim 4, wherein the top of the circular portion of the first support part is provided on the extreme downstream side in the direction of rotation of the carrier.

6. The planetary gear unit according to claim 5, wherein:
the carrier further comprises a second support part formed by a hole and provided opposite the first support part, the second support part supporting a second end of the carrier pin opposite the first end; and
the carrier pin is inserted from the second support part in an axial direction to install the first supported part to the first support part.

7. The planetary gear unit according to claim 6, wherein the first support part to support the first supported part is provided to an output side of the carrier.

8. The planetary gear unit according to claim 6, further comprising a stopper provided opposite the second end of the carrier pin to prevent the carrier pin from dropping off from the carrier.

9. The planetary gear unit according claim 8, wherein the second end of the carrier pin contacts the stopper.

10. The planetary gear unit according to claim 1, wherein the first supported part of the carrier pin has a stepped portion of reduced diameter.

11. An image forming apparatus comprising:
an image carrier;
a drive unit to rotatively drive the image carrier;
a planetary gear unit coupled to both the image carrier and the drive unit to transmit torque from the drive unit reduced by the planetary gear unit to the image carrier, the planetary gear unit comprising:
a sun gear rotatable by the torque;
an outer gear disposed coaxially with the sun gear;
multiple planetary gears disposed within the outer gear at equal intervals along an inner circumference of the outer gear to engage both the sun gear and the outer gear, respectively;
a carrier pin to rotatably support each of the multiple planetary gears, at least a first end of the carrier pin being constructed of a circular portion and a linear portion in cross-section to form a first supported part; and
a carrier rotatable coaxially with both the sun gear and the outer gear to support both ends of the carrier pin, the carrier having a first support part that engages or is fitted with the first supported part to support the first supported part, the first support part being formed to position the circular portion of the first supported part downstream from the linear portion in a direction of rotation of the carrier; and
an image forming unit to form an image on the image carrier.

12. The image forming apparatus according to claim 11, wherein the planetary gear unit is provided in two stages.

* * * * *